United States Patent
Hur et al.

(10) Patent No.: US 11,891,265 B2
(45) Date of Patent: Feb. 6, 2024

(54) DETECTING AND PROCESSING MULTI FEEDING

(71) Applicant: Hewlett-Packard Development Company, L.P., Spring, TX (US)

(72) Inventors: Sungchang Hur, Pangyo (KR); Uichoon Lee, Pangyo (KR); Myung Soo Jeong, Suwon (KR); Jae Wuk Lee, Suwon (KR); Wootan Son, Suwon (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 141 days.

(21) Appl. No.: 17/414,904

(22) PCT Filed: Jun. 11, 2020

(86) PCT No.: PCT/US2020/037212
§ 371 (c)(1),
(2) Date: Jun. 16, 2021

(87) PCT Pub. No.: WO2020/263581
PCT Pub. Date: Dec. 30, 2020

(65) Prior Publication Data
US 2022/0135356 A1   May 5, 2022

(30) Foreign Application Priority Data

Jun. 28, 2019   (KR) .................. 10-2019-0078311

(51) Int. Cl.
*B65H 7/00*   (2006.01)
*B65H 7/12*   (2006.01)
(Continued)

(52) U.S. Cl.
CPC ............. *B65H 7/125* (2013.01); *B65H 7/18* (2013.01); *B65H 7/20* (2013.01); *G03G 15/50* (2013.01); *B65H 3/50* (2013.01)

(58) Field of Classification Search
CPC . B65H 7/00; B65H 7/12; B65H 7/125; B65H 7/18; B65H 7/20
(Continued)

(56) References Cited

U.S. PATENT DOCUMENTS 5,642,288 A      6/1997   Leung et al.
7,172,195 B2 *   2/2007   Sano .................. B65H 7/125
                                            271/262

(Continued)

FOREIGN PATENT DOCUMENTS

JP   19970100048        4/1997
JP   2004323143 A   *  11/2004   ............ B65H 5/062
(Continued)

*Primary Examiner* — Leslie A Nicholson, III
(74) *Attorney, Agent, or Firm* — Brooks, Cameron & Huebsch PLLC

(57) ABSTRACT

An example print medium supplying apparatus includes a print medium transporting device to pick up a print medium loaded in a loading portion and transport the picked-up print medium, a print medium alignment portion to align a leading end of the transported print medium, a first sensor to sense the print medium that passes through a feed roller of the print medium transporting device, and a processor to, based on a measured value with respect to the print medium sensed by the first sensor and a multi-feeding determination reference value corresponding to a sheet of the print medium, detect multi-feeding of the print medium and process the detected multi-feeding by controlling the print medium transporting device and the print medium alignment portion.

16 Claims, 8 Drawing Sheets

(51) Int. Cl.
*B65H 7/18* (2006.01)
*B65H 7/20* (2006.01)
*G03G 15/00* (2006.01)
*B65H 3/50* (2006.01)

(58) Field of Classification Search
USPC .................................. 271/10.01, 10.03, 110
See application file for complete search history.

(56) References Cited

U.S. PATENT DOCUMENTS

| | | | | |
|---|---|---|---|---|
| 7,270,325 | B2* | 9/2007 | Sano | B65H 7/125 |
| | | | | 271/262 |
| 7,913,991 | B2* | 3/2011 | Okamoto | B65H 7/02 |
| | | | | 271/10.12 |
| 7,950,657 | B2* | 5/2011 | Fushimi | B65H 7/12 |
| | | | | 271/262 |
| 8,613,440 | B2* | 12/2013 | Doan | G03G 15/602 |
| | | | | 399/374 |
| 9,981,819 | B2 | 5/2018 | Arima et al. | |
| 2009/0116746 | A1 | 5/2009 | Neogi et al. | |
| 2009/0160126 | A1 | 6/2009 | Okamoto | |
| 2010/0052248 | A1 | 3/2010 | Fushimi | |
| 2020/0039775 | A1* | 2/2020 | Isono | B65H 7/20 |

FOREIGN PATENT DOCUMENTS

| | | |
|---|---|---|
| JP | 20120098396 | 5/2012 |
| JP | 20120201488 | 10/2012 |
| JP | 20160124685 | 7/2016 |

* cited by examiner

DETECTING AND PROCESSING MULTI FEEDING

BACKGROUND

With developments in image forming apparatuses such as printers, copiers, scanners, fax machines, and multi-function printers, technology for stably separating and supplying several sheets of print media while quickly supplying print media to an image forming portion included in an image forming apparatus is attracting much attention. When multi-feeding of print media occurs, namely, when several sheets of print media are supplied to the image forming portion while overlapping and not being separated from each other, proper printouts may not be obtained, or the image forming apparatus may be defective.

DETAILED DESCRIPTION OF EXAMPLES

Figure 1:
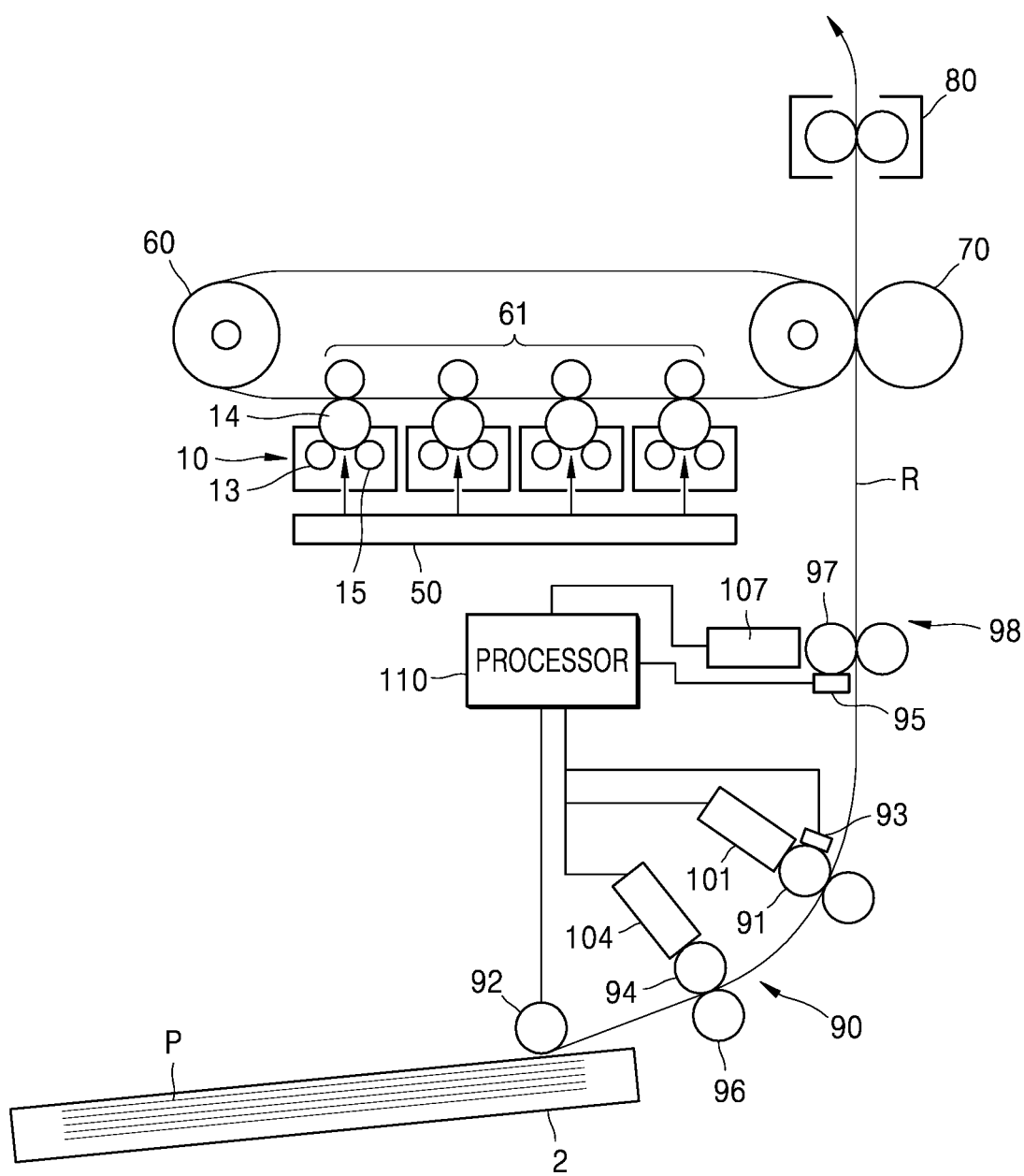
FIG. 1 is a schematic diagram of an image forming apparatus and an operation of a print medium supplying apparatus, according to an example.

Various examples now will be described more fully hereinafter with reference to the accompanying drawings. Like reference numerals in the specification and drawings denote like elements, and thus their description will be omitted.

FIG. 1 is a schematic diagram of an image forming apparatus and an operation of a print medium supplying apparatus, according to an example. The image forming apparatus according to an example may print an image (e.g., a color image) by using an electrophotographic developing method.

Referring to FIG. 1, each of a plurality of developing devices 10 may include a photoconductor 14 having an electrostatic latent image formed on its surface, and a developing roller 13 that develops the electrostatic latent image to a visible toner image by supplying a developer to the electrostatic latent image. A photoconductive drum is an example of the photoconductor 14, which may be an organic photoconductor (OPC). A charging roller 15 is an example of a charger that charges a surface of the photoconductor 14 to have a uniform surface potential. The developer contained in each developer cartridge (not shown) may be supplied to each developing device 10. The developer contained in the developer cartridge may be a toner.

An exposure device 50 radiates light modulated in correspondence with image information onto the photoconductor 14 and forms the electrostatic latent image on the photoconductor 14. Representative examples of the exposure device 50 may include a laser scanning unit (LSU), and the like.

A transfer device may transfer the toner image formed on the photoconductor 14 to a print medium P and may be an intermediate transfer type transfer device. For example, the transfer device may include an intermediate transfer medium 60, a plurality of intermediate transfer rollers 61, and a transfer roller 70. An intermediate transfer belt is an example of the intermediate transfer medium 60 to which the toner image formed on the photoconductor 14 of each of the plurality of developing devices 10 is transferred, and may temporarily accommodate the toner image. An intermediate transfer bias voltage for intermediate-transferring the toner image formed on the photoconductor 14 to the intermediate transfer medium 60 may be applied to each of the plurality of intermediate transfer rollers 61. The transfer roller 70 may be positioned to face the intermediate transfer medium 60. A transfer bias voltage may be applied to the transfer roller 70 so as to transfer, to the print medium P, the toner image transferred to the intermediate transfer medium 60.

A fixing device 80 may apply heat and/or pressure to the toner image transferred onto the print medium P to thereby fix the toner image to the print medium P.

According to the above-described structure, the exposure device 50 may form electrostatic latent images on the photoconductors 14 of the plurality of developing devices 10 by radiating a plurality of light beams to the photoconductors 14, the plurality of light beams being modulated in correspondence with pieces of image information respectively corresponding to colors. The electrostatic latent images on the photoconductors 14 of the plurality of developing devices 10 may be developed to visible toner images by cyan (C), magenta (M), yellow (Y), and black (K) developers supplied from a plurality of developer cartridges (not shown) to the plurality of developing devices 10. The developed toner images may be sequentially intermediate-transferred to the intermediate transfer medium 60. The print medium P loaded on a loading portion 2 may be transported by a print medium transporting device 90 along a paper supply path R and be positioned between the transfer roller 70 and the intermediate transfer medium 60. The toner images that are intermediate-transferred onto the intermediate transfer medium 60 may be transferred to the print medium P due to the transfer bias voltage applied to the transfer roller 70. When the print medium P passes through the fixing device 80, the toner images are fixed onto the print medium P due to heat and pressure. The print medium P for which fixing has been completed may be discharged by a discharge roller (not shown).

The print medium supplying apparatus of the image forming apparatus according to an example may include the print medium transporting device 90, a print medium alignment portion 98, and a processor 110.

The print medium transporting device 90 may include a pickup roller 92, a forward roller 94, a retard roller 96, a feed roller 91, and at least one driving portion, namely, a feed roller driving portion 101 and a forward roller driving portion 104, respectively driving the feed roller 91 and the forward roller 94.

The pickup roller 92 may pick up a print medium loaded in the loading portion 2.

The forward roller 94 may transport the picked-up print medium in engagement with the retard roller 96.

The feed roller 91 may transport the print medium to the print medium alignment portion 98 along the sheet supply path R. The feed roller 91 may transport a print medium or change a transport speed, according to a time period when the print medium reaches a sensing location of a first sensor 93 where the first sensor 93 performs sensing.

The forward roller driving portion 104 may rotate the forward roller 94 in a print medium transporting direction. The feed roller driving portion 101 may rotate the feed roller 91 in the print medium transporting direction and may include a step motor. The pickup roller 92 may be connected to the forward roller 94 via a connection gear and may rotate with rotation of the forward roller 94 or may be rotated independently by a driving portion.

The first sensor 93 may sense a print medium that passes the feed roller 91 of the print medium transporting device 90. The first sensor 93 may be a feed sensor that is located near the feed roller 91 and senses a certain portion of a print medium on the sheet supply path R when the print medium is picked up from the loading portion 2 and transported.

The print medium alignment portion 98 may align a leading end of the print medium and supply the aligned print medium to the image forming portion. The print medium alignment portion 98 may include a resist roller 97 and a resist roller driving portion 107.

A second sensor 95 may sense the print medium transported to the resist roller 97 of the print medium alignment portion 98 to correct a leading end skew of the print medium.

The print medium alignment portion 98 may correct the leading end skew of the print medium to make a leading end of an image in a printing operation identical to the corrected leading end of the print medium. When the corrected leading end of the print medium is identical to the leading end of the image in the printing operation in the print medium alignment portion 98, an image formed on the intermediate transfer medium 60 is transferred to the print medium and fixed to the print medium by the fixing device 80.

The processor 110 may control an operation of the print medium supplying apparatus or the image forming apparatus. The processor 110 may be a processor included in the main body of the image forming apparatus or may be a special processor included in the print medium supplying apparatus.

When the print media loaded on the loading portion 2 are picked up by the pickup roller 92, the print media may be transported while multi-feeding is prevented by the forward roller 94 and the retard roller 96. The processor 110 may control pickup and transportation of the print media by controlling the print medium transporting device 90 according to the time when a print medium has reached the first sensor 93, namely, a time point when the leading end of the print medium is sensed. The processor 110 may control the print medium alignment portion 98 to align the leading end of the print medium transported along the sheet supply path R by using the resist roller 97 and supply the aligned print medium to the image forming portion.

The print medium supplying apparatus may consecutively supply the print media to the image forming portion of the image forming apparatus, and at the same time stably separate and provide several sheets of print media by controlling a gap between consecutively-supplied print media. However, multi-feeding of print media may occur due to various causes, such as a friction coefficient between print media, usage environment (such as, generation of static electricity or a high humidity), abrasion of rollers for use in print medium transportation, and the characteristics of paper itself. The multi-feeding of print media may include not only a case when a paper sheet being a print medium is overlapped by another paper sheet, but also a case where, because a gap between paper sheets, namely, a paper gap, is shorter than a predetermined reference, two consecutive paper sheets are sensed as one paper sheet.

An example method of detecting and processing multi-feeding of print media when the multi-feeding of print media occurs in an image forming apparatus will be described with reference to FIGS. 2 through 9.

Figure 2:
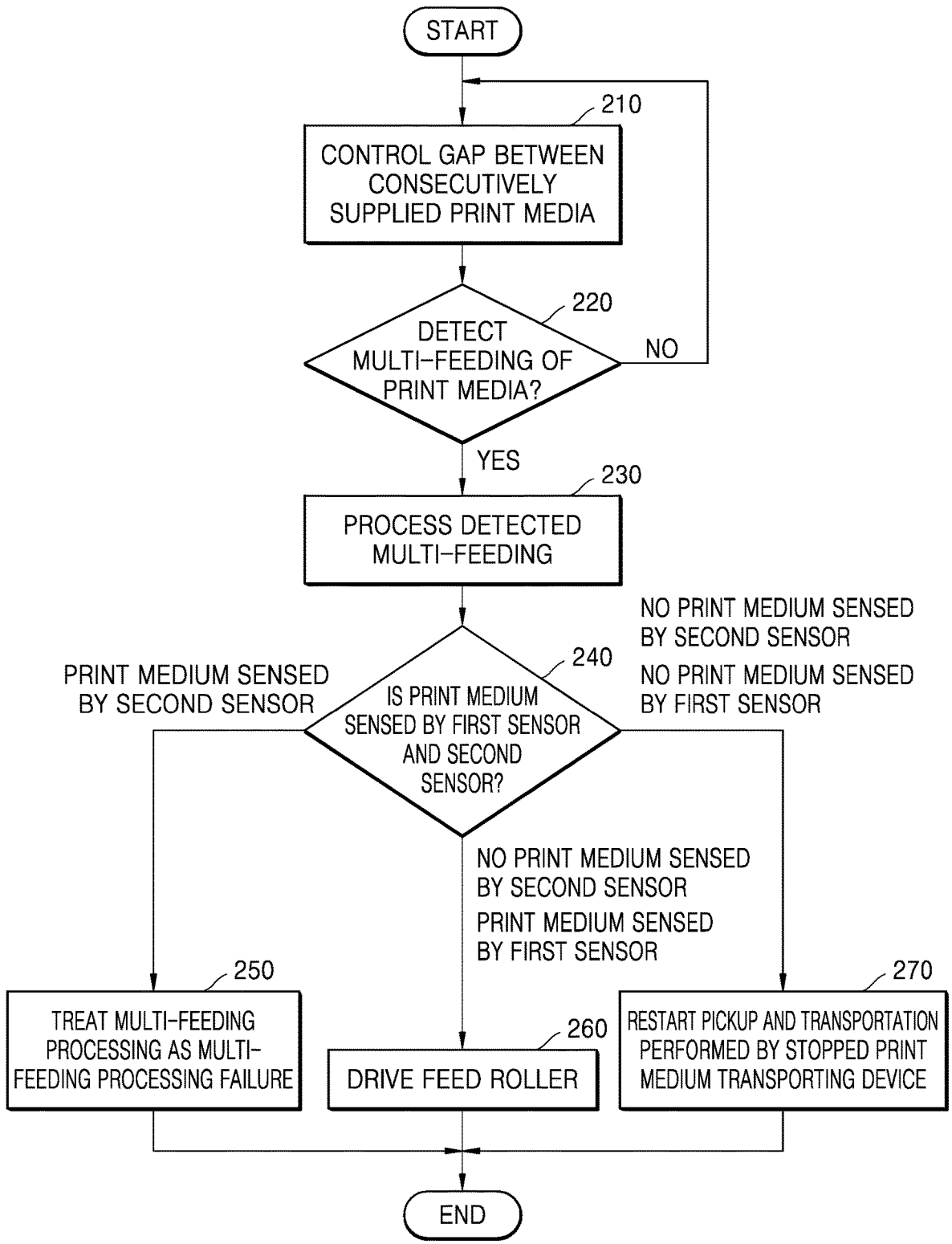
FIG. 2 is a flowchart of a method of controlling a print medium supplying apparatus that detects and processes multi-feeding of print media, according to an example.

FIG. 2 is a flowchart of a method of controlling a print medium supplying apparatus that detects and processes multi-feeding of print media, according to an example.

In an example, the print medium supplying apparatus that detects and processes multi-feeding of print media may be controlled by a processor included in the main body of the image forming apparatus or by a special processor included in the print medium supplying apparatus.

Referring to FIG. 2, in operation 210, the print medium supplying apparatus may control a gap between consecutively supplied print media in order to supply print media to an image forming portion included in the image forming apparatus. In an example, the print medium supplying apparatus may quickly and consecutively supply the print media while controlling the gap between print media to be maintained constant, thereby increasing the quality of printouts and preventing a jam from occurring due to multi-feeding of print media.

Figure 3:
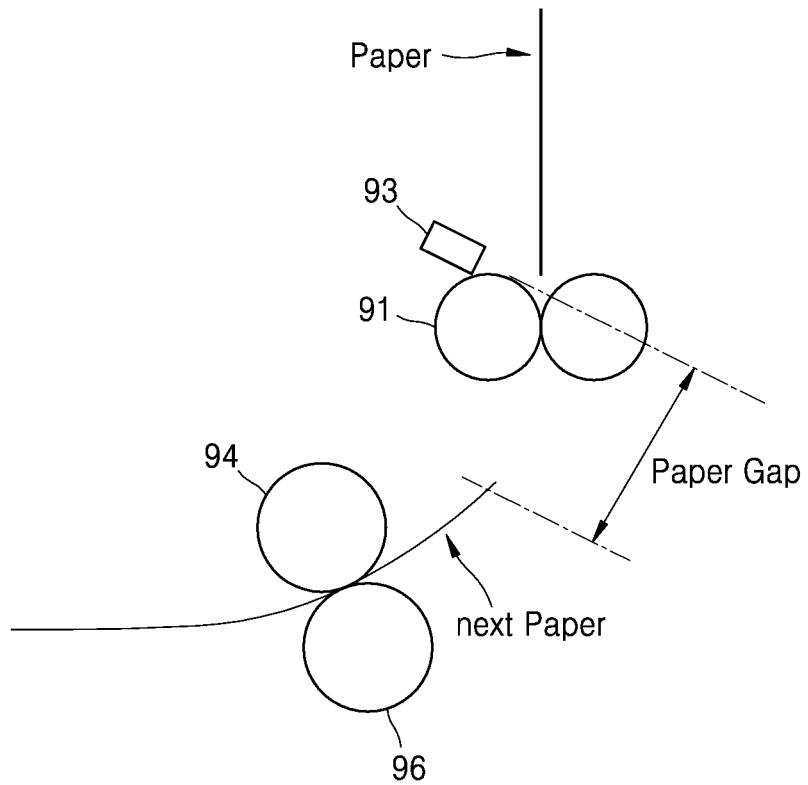
FIG. 3 is a diagram for explaining a process in which a print medium supplying apparatus controls a gap between print media, according to an example.

FIG. 3 is a diagram for explaining a process in which a print medium supplying apparatus controls a gap between print media, according to an example.

Referring to FIG. 3, a starting location of a print medium in the print medium supplying apparatus may be an artificial location between a location of the leading ends of the print media loaded in the loading portion 2 and a nip location where the forward roller 94 and the retard roller 96 are formed. However, a case in which the leading end of a print medium passes the nip location and protrudes in a transporting direction of the print medium may occur due to various causes. In this case, the starting location of the print medium (i.e., "next Paper") is drawn closer to a trailing end of a print medium (i.e., "Paper") transported right before, and thus multi-feeding of print media may be highly likely to occur. To prevent multi-feeding of print media, the print medium supplying apparatus may control a gap between print media by determining a transporting timing of a print medium based on the degree to which the print medium protrudes from the nip location, namely, the degree to which the leading end of the print medium precedes (hereinafter, referred to as a preceding amount).

For example, when a measured time period during which the leading end of the print medium starts from the starting location of the print medium and reaches the sensing location of the first sensor 93 is shorter than a predetermined reference time period, the print medium supplying apparatus may stop driving the feed roller 91 during a time period corresponding to a difference between the predetermined reference time period and the measured time period. By checking the preceding amount of the print medium by using the time period during which the leading end of a print medium that has been picked up and started to be transported reaches the first sensor 93, a transporting time period of the print medium is delayed by a time period corresponding to the checked preceding amount.

Referring again to FIG. 2, in operation 220, the print medium supplying apparatus may detect multi-feeding of print media while print media are being transported. The print medium supplying apparatus may check whether multi-feeding of print media occurs in real time. In response to a result of the checking, the print medium supplying apparatus may control the gap between print media according to a normal routine (corresponding to operations 210 and 220) or may process the multi-feeding according to a multi-feeding processing routine (corresponding to operation 230 and subsequent operations). When the multi-feeding processing routine is concluded and a new print operation is performed, the gap between print media may be again controlled based on the preceding amount of the print medium according to the normal routine.

Figure 4:
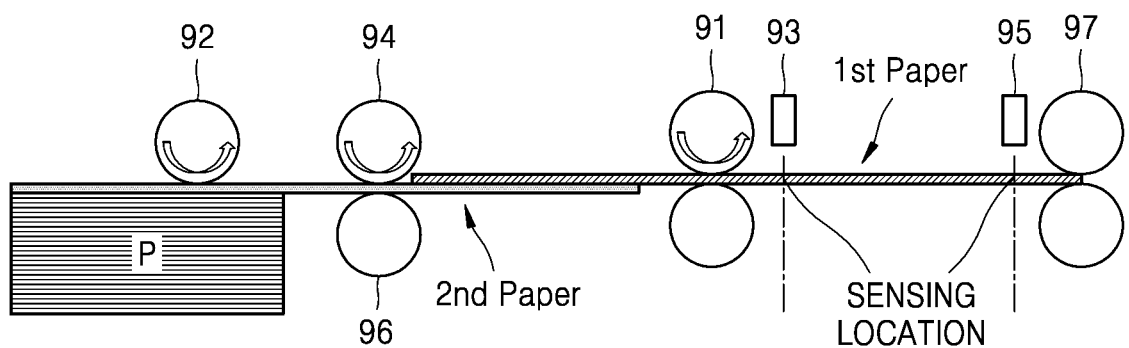
FIG. 4 is a diagram for explaining a process in which a print medium supplying apparatus detects multi-feeding of print media, according to an example.

FIG. 4 is a diagram for explaining a process in which a print medium supplying apparatus detects multi-feeding of print media, according to an example.

Referring to FIG. 4, the print medium supplying apparatus may detect multi-feeding of print media, based on a measured value with respect to a print medium sensed by the first sensor 93 and a multi-feeding determination reference value corresponding to a sheet of print medium.

For example, the print medium supplying apparatus may measure a time period lapsed from when the leading end of a print medium is sensed before the first sensor 93 senses a trailing end of a print medium, or measure a length of the print medium calculated after the first sensor 93 senses the leading end of the print medium.

The multi-feeding determination reference value may be determined based on size information of a print medium currently being printed and a linear velocity of the feed roller 91. Because the multi-feeding determination reference value may vary according to a structure or operating method of each image forming apparatus, the multi-feeding determination reference value may be previously set in each image forming apparatus or may be set based on data according to test runs.

As illustrated in FIG. 4, because second paper currently passing the forward roller 94 and first paper currently passing the feed roller 91 overlap each other, when the first paper and the second paper are continuously transported in this state, the first sensor 93 senses a print medium that is longer than a single sheet of print medium, and thus the print medium supplying apparatus may detect multi-feeding of print media.

Referring again to FIG. 2, in operation 230, the print medium supplying apparatus may control the print medium transporting device 90 and the print medium alignment portion 98 to process the detected multi-feeding.

Figure 5:
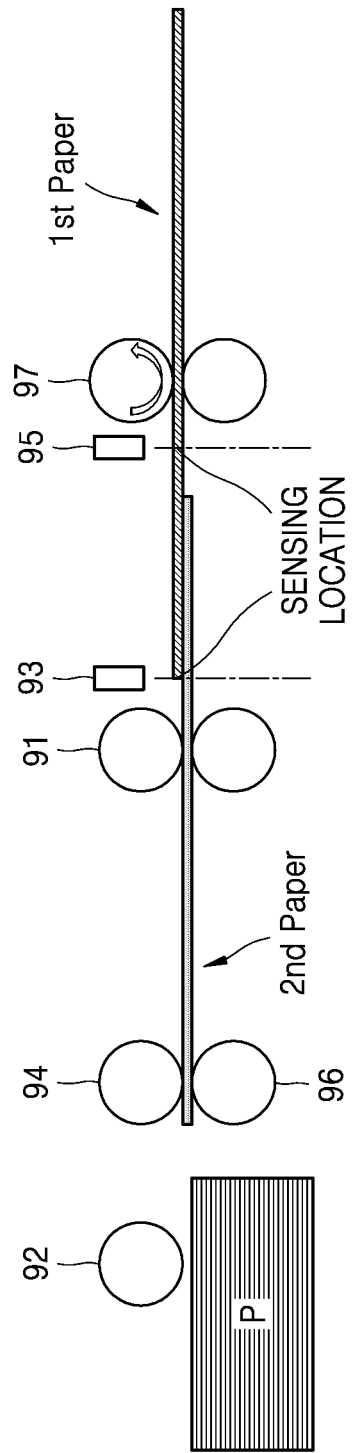
FIG. 5 is a diagram for explaining a process in which a print medium supplying apparatus processes detected multi-feeding of print media, according to an example.

FIG. 5 is a diagram for explaining a process in which a print medium supplying apparatus processes detected multi-feeding of print media, according to an example.

Referring to FIG. 5, second paper currently passing the feed roller 91 and first paper already having passed the first sensor 93 overlap each other, and thus multi-feeding occurs. In this case, because of the second paper where multi-feeding has occurred, the first sensor 93 consecutively senses a print medium at the sensing location of the first sensor 93 even when a trailing end of the first paper has passed the first sensor 93. As a result, because a time point lapsed from when the first sensor 93 has sensed the leading end of the first paper being a print medium exceeds a time period corresponding to the multi-feeding determination reference value or a length of the first paper obtained by multiplying the time point lapsed from when the first sensor 93 has sensed the leading end of the first paper by a transporting speed exceeds a length corresponding to the multi-feeding determination reference value, the print medium supplying apparatus may determine that multi-feeding of print media has occurred, and may detect multi-feeding of print media.

As illustrated in FIG. 5, the print medium supplying apparatus may stop driving the print medium transporting device 90 in order to process the detected multi-feeding, and may drive the print medium alignment portion 98 to supply, to the image forming portion, a print medium before a print medium where detected multi-feeding has occurred. As shown in FIG. 5, as the pickup roller 92, the forward roller 94, and the feed roller 91 are stopped operating and the resist roller 97 is driven and rotates, the second paper may be in a standby state, and the leading end of the first paper is aligned and then supplied to the image forming portion, and thus the detected multi-feeding may be processed.

Referring again to FIG. 2, in operation 240, the print medium supplying apparatus may check whether a print medium is sensed by the first sensor 93 and the second sensor 95 after the detected multi-feeding is processed. According to whether a print medium is sensed by the first sensor 93 and the second sensor 95, the print medium supplying apparatus may determine whether the detected multi-feeding has been properly processed or there is a print medium in a standby state during transporting, and thus an operation of the print medium supplying apparatus after the multi-feeding is processed may be changed.

Figure 6:
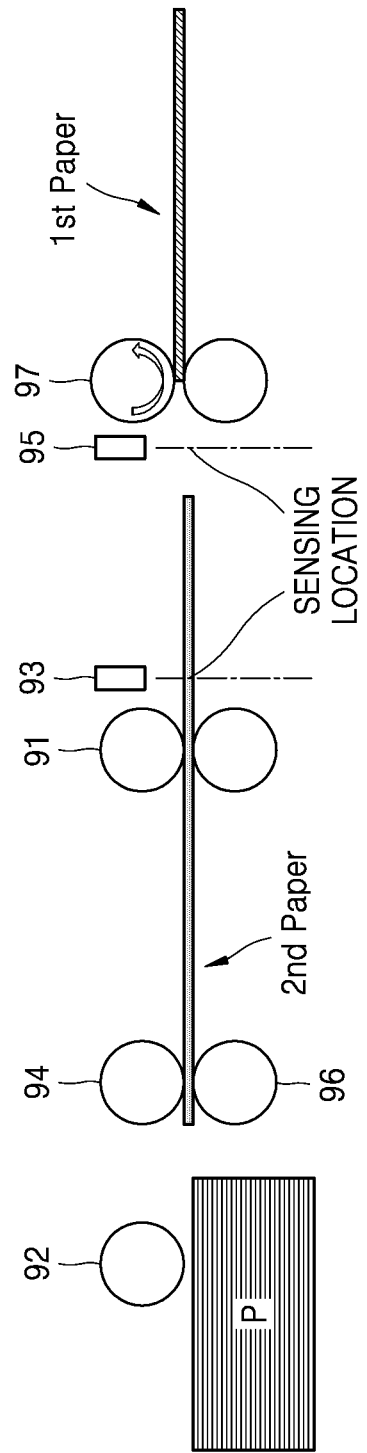
FIG. 6 is a diagram for explaining a process in which a print medium supplying apparatus determines whether detected multi-feeding of print media has been properly processed, according to an example.

FIG. 6 is a diagram for explaining a process in which a print medium supplying apparatus determines whether detected multi-feeding of print media has been properly processed, according to an example.

Referring to FIG. 6, the print medium supplying apparatus may determine whether the detected multi-feeding has been properly processed, according to whether a print medium is sensed by the second sensor 95 that senses a print medium transported to the resist roller 97 of the print medium alignment portion 98. As shown in FIG. 6, when there is no print medium sensed by the second sensor 95, the print medium supplying apparatus may determine that the detected multi-feeding has been properly processed.

Referring again to FIG. 2, in operation 250, when a print medium is sensed by the second sensor 95, the print medium supplying apparatus may determine that the detected multi-feeding has not been properly processed, and may treat the multi-feeding processing as a multi-feeding processing failure. When a print medium is sensed by the second sensor 95 in contrast with FIG. 6, the print medium supplying apparatus may determine that the detected multi-feeding has not been resolved even by a multi-feeding processing operation, and may treat the multi-feeding processing as a multi-feeding processing failure.

In operation 260, when no print medium is sensed by the second sensor 95 and a print medium is sensed by the first sensor 93, the print medium supplying apparatus may drive the feed roller 91 of the stopped print medium transporting device 90 again to transport the print medium where the detected multi-feeding has occurred.

In the example of FIG. 6, no print medium is sensed by the second sensor 95, whereas the second paper being a print medium is sensed by the first sensor 93. As shown in FIG. 6, even when the print medium supplying apparatus normally processes the detected multi-feeding, because the second paper being the print medium where detected multi-feeding has occurred is in a standby state after the print medium transporting device 90 is stopped operating, the second paper may be sensed by the first sensor 93. Accordingly, when it is determined that the detected multi-feeding of print media has been properly processed, the print medium supplying apparatus may, as a subsequent procedure, process the print medium where detected multi-feeding has occurred.

Figure 7:
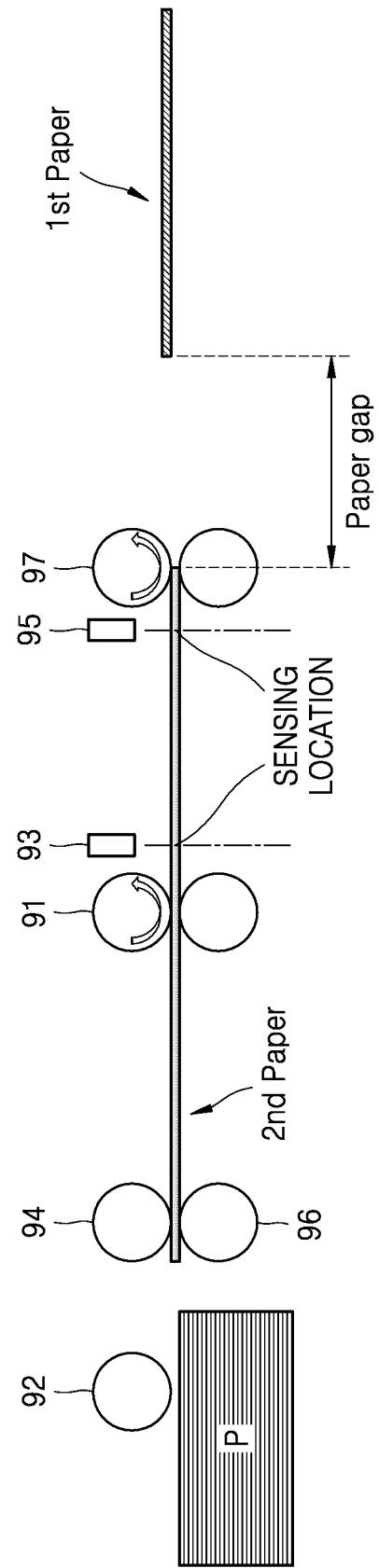
FIG. 7 is a diagram for explaining a process in which a print medium supplying apparatus processes a print medium where detected multi-feeding has occurred, according to an example.

FIG. 7 is a diagram for explaining a process in which a print medium supplying apparatus processes the print medium where detected multi-feeding has occurred, according to an example.

Referring to FIG. 7, when no print medium is sensed by the second sensor 95, the print medium supplying apparatus may determine that the detected multi-feeding has been properly processed. In order to process the print medium where the detected multi-feeding has occurred, the print medium supplying apparatus may drive the feed roller 91 of the print medium transporting device 90 again and transport the second paper being the print medium where the detected multi-feeding has occurred, as shown in FIG. 7. At this time, the first sensor 93 may continuously sense the print medium being transported. When the first sensor 93 no longer senses a print medium or a certain time period lapses, the print medium supplying apparatus may determine that the print medium where the detected multi-feeding has occurred has been processed.

Figure 8:
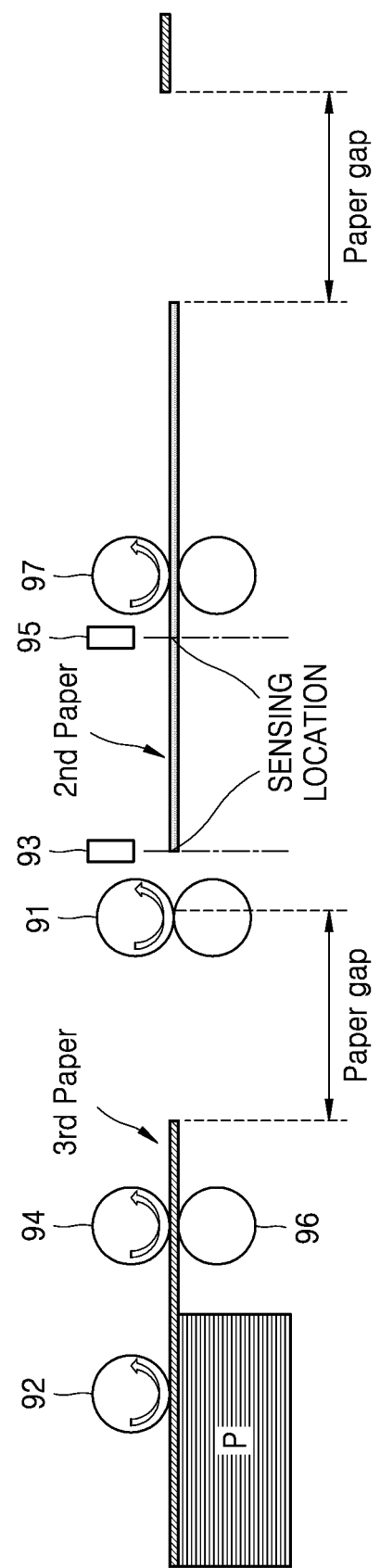
FIG. 8 is a diagram for explaining pickup and transportation performed by a print medium transporting device after a print medium supplying apparatus processes the print medium where the detected multi-feeding has occurred, according to an example.

FIG. 8 is a diagram for explaining pickup and transportation performed by a print medium transporting device after a print medium supplying apparatus processes the print medium where the detected multi-feeding has occurred, according to an example.

Referring to FIG. 8, the print medium supplying apparatus may process the second paper being the print medium where the detected multi-feeding has occurred. When no print medium is sensed by the first sensor 93, the print medium supplying apparatus may enable a pickup initiating command to supply a print medium to perform a print operation. At this time, a print medium supplying process related with an existing printing operation may be canceled, and a print medium may be supplied according to a method in which a print medium supplying process related with a new printing operation is initiated. As illustrated in FIG. 8, the pickup roller 92 and the forward roller 94 may be driven again, and thus pickup and transportation of third paper may start.

Referring again to FIG. 2, in operation 270, when no print medium is sensed by the second sensor 95 and no print medium is sensed by the first sensor 93, the print medium supplying apparatus may restart the pickup and transportation by the stopped print medium transporting device 90.

When no print medium is sensed by either the second sensor 95 or the first sensor 93, in contrast with FIG. 6, the print medium supplying apparatus may determine that detected multi-feeding has been properly processed and the print medium where the detected multi-feeding has occurred does not exist. To perform the residual printing operation or a new printing operation, the print medium supplying apparatus may restart the pickup and transportation by the print medium transporting device 90 stopped to process the detected multi-feeding.

Figure 9:
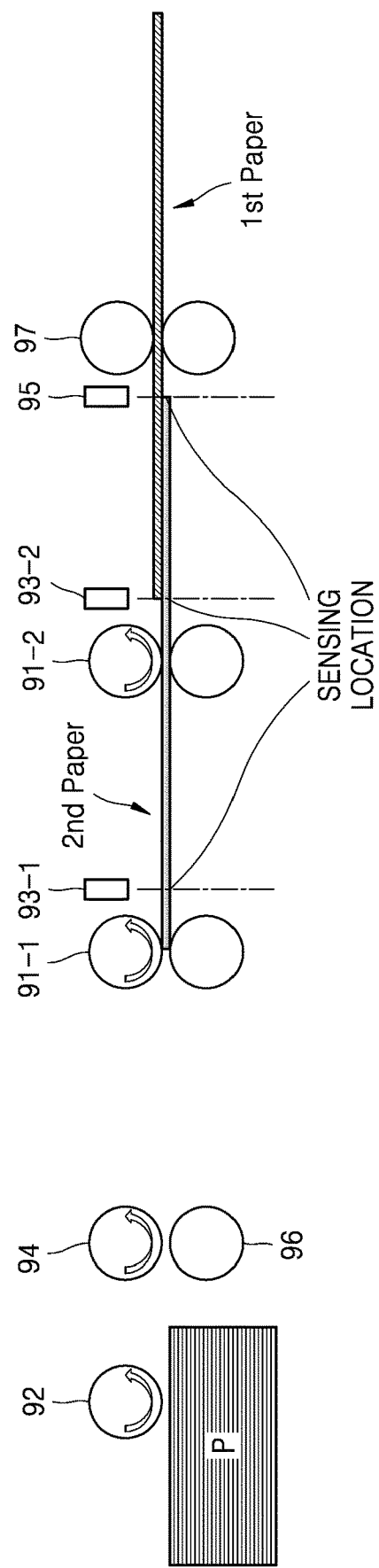
FIG. 9 is a diagram for explaining a process in which a print medium supplying apparatus detects and processes multi-feeding of print media when a plurality of feed rollers and a plurality of sensors are included on a sheet supply path, according to an example.

FIG. 9 is a diagram for explaining a process in which a print medium supplying apparatus detects and processes multi-feeding of print media when a plurality of feed rollers and a plurality of sensors are included on a sheet supply path, according to an example.

Referring to FIG. 9, according to the type of image forming apparatus or locations of trays in the case of multiple trays, the print medium supplying apparatus may have different structures or may operate differently. Accordingly, a method of controlling a print medium supplying apparatus that detects and processes multi-feeding of print media may be applied by expanding the above-described multi-feeding detecting and processing method, in consideration of the structure or operating method of the print medium supplying apparatus.

For example, when the print medium transporting device 90 includes, on a sheet supply path, a plurality of feed rollers and a plurality of sensors that sense print media respectively passing the plurality of feed rollers, the print medium supplying apparatus may detect multi-feeding of print media, based on a measured value with respect to a print medium sensed by a sensor corresponding to a feed roller located closest to the loading portion 2 from among the plurality of sensors, and may process a print medium where the detected multi-feeding of print media has occurred, by using a sensor corresponding to a feed roller located secondly closest to the loading portion 2 from among the plurality of sensors.

Referring to FIG. 9, two feed rollers 91-1 and 91-2, and two sensors 93-1 and 93-2 that sense print media respectively passing the two feed rollers 91-1 and 91-2 may be included in the print medium transporting device 90. The two feed rollers 91-1 and 91-2 may be driven by a single driving portion. The print medium supplying apparatus may detect multi-feeding of print media, based on a measured value with respect to a print medium sensed by the sensor 93-1 corresponding to the feed roller 91-1, and may process second paper being the print medium where the detected multi-feeding of print media has occurred, by using the sensor 93-2 corresponding to the feed roller 91-2.

The above-described method of controlling a print medium supplying apparatus may be embodied in form of a non-transitory computer-readable recording medium storing computer-executable instructions or data. The above-described examples can be written as computer programs and can be implemented in general-use digital computers that execute the programs using a non-transitory computer-readable recording medium. Examples of the non-transitory computer-readable recording medium may include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, a magnetic tape, a floppy disk, a magneto-optical data storage device, an optical data storage device, a hard disk, a solid-state disk (SSD), and any device capable of storing an instruction or software, related data, a data file, and data structures and providing the instruction or software, the related data, the data file, and the data structures to a processor or a computer such that the processor or the computer execute the instruction.

What is claimed is:

1. A print medium supplying apparatus comprising:
a print medium transporting device to pick up a print medium loaded in a loading portion and transport a picked-up print medium;
a print medium alignment portion to align a leading end of the transported print medium;
a first sensor to sense the print medium that passes through a feed roller of the print medium transporting device;
a processor; and
a non-transitory computer readable medium storing computer-executable instructions that when executed by the processor cause the processor to:
based on a measured value with respect to the print medium sensed by the first sensor and a multi-feeding determination reference value corresponding to a sheet of the print medium, detect multi-feeding of the print medium and process the detected multi-feeding by controlling the print medium transporting device and the print medium alignment portion to, based on a predetermined gap distance, control transport of picked-up print medium by controlling a distance of a gap between a first sheet of picked-up print medium and a second sheet of picked-up print medium,
wherein the controlled distance between the first sheet of print medium and the second sheet of print medium corresponds to a distance between the first sensor and a second sensor.

2. The print medium supplying apparatus of claim 1, wherein the instructions are further to cause the processor to detect the multi-feeding of the print medium when a time period elapsed from when the leading end of the print medium has been sensed by the first sensor before the first sensor senses a trailing end of the print medium exceeds a time period corresponding to the multi-feeding determination reference value.

3. The print medium supplying apparatus of claim 2, wherein the multi-feeding determination reference value is determined based on size information of the print medium and a linear velocity of the feed roller.

4. The print medium supplying apparatus of claim 1, wherein the instructions are further to cause the processor to:
stop driving the print medium transporting device to process the detected multi-feeding; and
drive the print medium alignment portion to supply, to an image forming portion, a print medium before the print medium where the detected multi-feeding has occurred.

5. The print medium supplying apparatus of claim 4, wherein the second sensor is to sense the print medium transported to a resist roller of the print medium alignment portion, and
wherein the instructions are further to cause the processor to determine whether the detected multi-feeding has been properly processed according to whether the print medium is sensed by the second sensor.

6. The print medium supplying apparatus of claim 5, wherein the instructions are further to cause the processor to:
drive again the feed roller of the stopped print medium transporting device to transport the print medium where the detected multi-feeding has occurred, when no print medium is sensed by the second sensor; and
treat the multi-feeding processing as a multi-feeding processing failure while the print medium is sensed by the second sensor.

7. The print medium supplying apparatus of claim 5, wherein the instructions are further to cause the processor to restart pickup and transportation by the stopped print medium transporting device when no print medium is sensed by the second sensor and no print medium is sensed by the first sensor.

8. The print medium supplying apparatus of claim 1, wherein the instructions are further to cause the processor to, when a measured time period from when the leading end of the print medium starts moving from a starting location of the print medium until the leading end of the print medium reaches a sensing location of the first sensor is shorter than a predetermined reference time period, stop driving the feed roller during a time period corresponding to a difference between the predetermined reference time period and the measured time period.

9. The print medium supplying apparatus of claim 1, wherein the instructions are further to cause the processor to, when the print medium transporting device comprises, on a sheet supply path, a plurality of feed rollers and a plurality of sensors that sense print media respectively passing through the plurality of feed rollers:
detect multi-feeding of the print medium based on a measured value with respect to the print medium sensed by a sensor corresponding to a feed roller located closest to the loading portion from among the plurality of sensors; and
process the print medium where the detected multi-feeding has occurred by using a sensor corresponding to a feed roller located secondly closest to the loading portion from among the plurality of sensors.

10. The print medium supplying apparatus of claim 1, wherein the first sensor is located adjacent to the feed roller and the second sensor is located adjacent to the print medium alignment portion.

11. An image forming apparatus comprising:
an image forming portion;
a print medium transporting device to pick up a print medium loaded in a loading portion and transport a picked-up print medium;
a print medium alignment portion to align a leading end of the transported print medium and supply the aligned print medium to the image forming portion;
a first sensor to sense the print medium that passes through a feed roller of the print medium transporting device;
a processor; and
a non-transitory computer readable medium storing computer-executable instructions that when executed by the processor cause the processor to:
based on a measured value with respect to the print medium sensed by the first sensor and a multi-feeding determination reference value corresponding to a sheet of the print medium, detect multi-feeding of the print medium and process the detected multi-feeding by controlling the print medium transporting device and the print medium alignment portion to, based on a predetermined gap distance, control transport of picked-up print medium by controlling a distance of a gap between a first sheet of picked-up print medium and a second sheet of picked-up print medium,
wherein the controlled distance between the first sheet of print medium and the second sheet of print medium corresponds to a distance between the first sensor and a second sensor.

12. The image forming apparatus of claim 11, wherein the instructions are further to cause the processor to detect the multi-feeding of the print medium, when a time period elapsed from when the leading end of the print medium has been sensed before the first sensor senses a trailing end of the print medium exceeds a time period corresponding to the multi-feeding determination reference value.

13. The image forming apparatus of claim 11, wherein the instructions are further to cause the processor to:
   stop driving the print medium transporting device to process the detected multi-feeding; and
   drive the print medium alignment portion to supply, to the image forming portion, a print medium before the print medium where the detected multi-feeding has occurred.

14. The image forming apparatus of claim 13, wherein the second sensor is to sense the print medium transported to a resist roller of the print medium alignment portion,
   wherein the instructions are further to cause the processor to determine whether the detected multi-feeding has been properly processed according to whether the print medium is sensed by the second sensor.

15. The image forming apparatus of claim 14, wherein the instructions are further to cause the processor to:
   drive again the feed roller of the stopped print medium transporting device to transport the print medium where the detected multi-feeding has occurred, when no print medium is sensed by the second sensor; and
   treat the multi-feeding processing as a multi-feeding processing failure while the print medium is sensed by the second sensor.

16. The image forming apparatus of claim 14, wherein the instructions are further to cause the processor to restart pickup and transportation by the stopped print medium transporting device when no print medium is sensed by the second sensor and no print medium is sensed by the first sensor.

* * * * *